(12) United States Patent
Evans

(10) Patent No.: US 10,671,558 B1
(45) Date of Patent: Jun. 2, 2020

(54) DISTRIBUTED TIME SYNCHRONIZATION PROTOCOL FOR AN ASYNCHRONOUS COMMUNICATION SYSTEM

(71) Applicant: Simmonds Precision Products, Inc., Vergennes, VT (US)

(72) Inventor: Owen Daniel Evans, Burnsville, MN (US)

(73) Assignee: Simmonds Precision Products, Inc., Vergennes, VT (US)

(*) Notice: Subject to any disclaimer, the term of this patent is extended or adjusted under 35 U.S.C. 154(b) by 0 days.

(21) Appl. No.: 16/224,235

(22) Filed: Dec. 18, 2018

(51) Int. Cl.
*G06F 13/42* (2006.01)
*G06F 13/40* (2006.01)
*G06F 13/16* (2006.01)

(52) U.S. Cl.
CPC ............ *G06F 13/405* (2013.01); *G06F 13/16* (2013.01)

(58) Field of Classification Search
CPC ...................................................... G06F 13/42
See application file for complete search history.

(56) References Cited

U.S. PATENT DOCUMENTS

| | | | |
|---|---|---|---|
| 6,370,159 B1 | 4/2002 | Eidson | |
| 9,021,292 B2 | 4/2015 | Ross | |
| 9,344,208 B2 | 5/2016 | Belhadj et al. | |
| 9,900,120 B2 | 2/2018 | Wang et al. | |
| 10,359,823 B2 * | 7/2019 | Asano | |
| 2010/0082117 A1 | 4/2010 | Korsberg et al. | |
| 2017/0317812 A1 | 11/2017 | Leng et al. | |
| 2017/0373821 A1 | 12/2017 | Arakawa | |
| 2018/0259941 A1 | 9/2018 | De Renzis et al. | |

OTHER PUBLICATIONS

Extended European Search Report for European Patent Application No. 19217501.6, dated Apr. 1, 2020.

* cited by examiner

*Primary Examiner* — Cheng Yuan Tseng
(74) *Attorney, Agent, or Firm* — Locke Lord LLP; Scott D. Wofsy; Judy R. Naamat

(57) ABSTRACT

A slave node of one or more slave nodes and a master node of a distributed acquisition system and a method of synchronizing communication of the slave node is provided. The method includes acquiring a configuration that provides a definition for a packet interval, wherein the packet interval definition provides an adequate timing margin to ensure that communication packets transmitted by the master node and the one or more slave nodes occur only at harmonics of the packet interval definition. The method further includes receiving master communication packets from the master node via the bus, determining a start time of at least one most recent master communication packet of the master communication packets received from the master node, calculating a synchronization time based on the start time, and starting transmission of slave communication packets to the master node based on the synchronization time.

16 Claims, 10 Drawing Sheets

DISTRIBUTED TIME SYNCHRONIZATION PROTOCOL FOR AN ASYNCHRONOUS COMMUNICATION SYSTEM

BACKGROUND OF THE INVENTION

1. Field of the Invention

The present disclosure relates a protocol for an asynchronous communication system, and more particularly, a distributed time synchronization protocol for the asynchronous communication system.

2. Description of Related Art

Distributed acquisition systems perform remote data acquisition and processing. Acquired or processed information can be transferred to a processing component via one or more communication links for aggregation, analysis, data storage, and/or reporting.

For certain modes of operation, data acquisition needs to be highly correlated among a set of distributed slave devices. To accomplish this need, a master generated time synchronization pulse is often employed in which the pulse transition signifies the time reference for each slave.

The synchronization pulse is delivered via an independent physical link dedicated to time synchronization, adding cost and weight. In addition, differences in propagation delay among slave devices due to various cable lengths add timing errors which can degrade system performance.

While conventional methods and systems have generally been considered satisfactory for their intended purpose, there is still a need in the art for an improved distributed time synchronization protocol for an asynchronous communication system.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a slave node of a distributed acquisition system is provided. The slave node includes a communication interface for interfacing between a control component and a bus and the control component. The bus is coupled to a master node distributed in the acquisition system. The control component is configured to acquire a configuration that provides a definition for a packet interval, wherein the packet interval definition provides an adequate timing margin to ensure that communication packets transmitted by the master node and the one or more slave nodes occur only at harmonics of the packet interval definition and receive master communication packets from the master node via the bus. The control component is further configured to determine a start time of at least one most recent master communication packet of the master communication packets received from the master node, calculate a synchronization time based on the start time, and start transmission of slave communication packets to the master node based on the synchronization time.

In embodiments, the control component can be further configured to determine whether the slave node has been granted ownership of the bus, wherein transmission of the slave communication packets can be started only when the slave node is granted ownership.

In embodiments, the grant of ownership to the slave node can be exclusive to the slave node.

In embodiments, determining whether ownership of the bus has been granted to the slave node can include determining a limitation of access to the bus associated with the grant of ownership. The control component can be further configured to refrain from starting transmission of the slave communication packets when ownership of the bus is no longer granted due to the limitation of access.

In embodiments, the limitation of access can specify a maximum number of slave communication packets that are allowed to be transmitted by the slave node while the slave node is granted ownership of the bus, a time interval after which the grant of ownership of the bus by the slave expires, or a number of packet interval definitions available to be used on the bus by the slave while granted ownership of the bus.

In embodiments, the packet interval definition can be a maximum expected time between successive transmission start times of master communication packets transmitted by the master node, and the slave communication packets transmitted by the slave node are synchronized based on the packet interval definition.

In embodiments, the packet interval definition can accommodate a maximum expected transmission time for transmitting the master communication packets transmitted by the master node or the slave communication packets transmitted by any of the plurality of slave nodes based on maximum packet payload size and communication baud rate definitions of the acquired configuration.

In embodiments, a master communication packet of the master communication packets received from the master node control component can include a request for acknowledgment that is received substantially together with a grant to ownership of the bus to the slave node. The synchronization time can be updated based on the time of receipt of the master communication packet, and a slave communication packet of the slave communication packets can be transmitted to the master node is started in response to the request for acknowledgment further based on the packet interval definition.

In embodiments, a second master communication packet of the master communication packets received from the master node can include a propagation delay measured by the master node based on an amount of time between start of transmission of the master communication packet until time of receipt of the master communication packet by the slave node and/or an amount of time between start of transmission of the communication packet transmitted by the slave node until receipt of the slave communication packet by the master node. The control component can be further configured to adjust a time for starting transmission of subsequent slave communication packets based on the propagation delay.

In embodiments, the packet interval definition can be based on delays caused by at least one of baud rate error due to clock differences between the master node and the slave node, processing when transitioning between control of the bus by the master node or the slave node to the other of the master node and the slave node, and sum of intercharacter timing gaps.

In embodiments, the slave node can further include a sensing element configured to sense a physical property and outputs sensing data based on the sensing and a buffer configured to buffer the sensing data. A master communication packet of the master communication packets received from the master node can include a request for sensed data. The control component can be further configured to include sensing data buffered by the buffer in one or more of the slave communication packets transmitted to the master node in response to receiving the master communication packet.

In accordance with further aspects of the disclosure, a method of synchronizing communication between a slave node and a master node of a distributed acquisition system is provided. The method includes acquiring a configuration that provides a definition for a packet interval, wherein the packet interval definition provides an adequate timing margin to ensure that communication packets transmitted by the master node and the one or more slave nodes occur only at harmonics of the packet interval definition, receiving master communication packets from the master node via the bus. The method further includes determining a start time of at least one most recent master communication packet of the master communication packets received from the master node, calculating a synchronization time based on the start time, and starting transmission of slave communication packets to the master node based on the synchronization time.

In accordance with another aspect of the disclosure a control component of a slave node of a distributed acquisition system is provided. The control component is configured to acquire a configuration that provides a definition for a packet interval, wherein the packet interval definition provides an adequate timing margin to ensure that communication packets transmitted by the master node and the one or more slave nodes occur only at harmonics of the packet interval definition. The control component is further configured to receive master communication packets from the master node via the bus, determine a start time of at least one most recent master communication packet of the master communication packets received from the master node, calculate a synchronization time based on the start time, and start transmission of slave communication packets to the master node based on the synchronization time.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
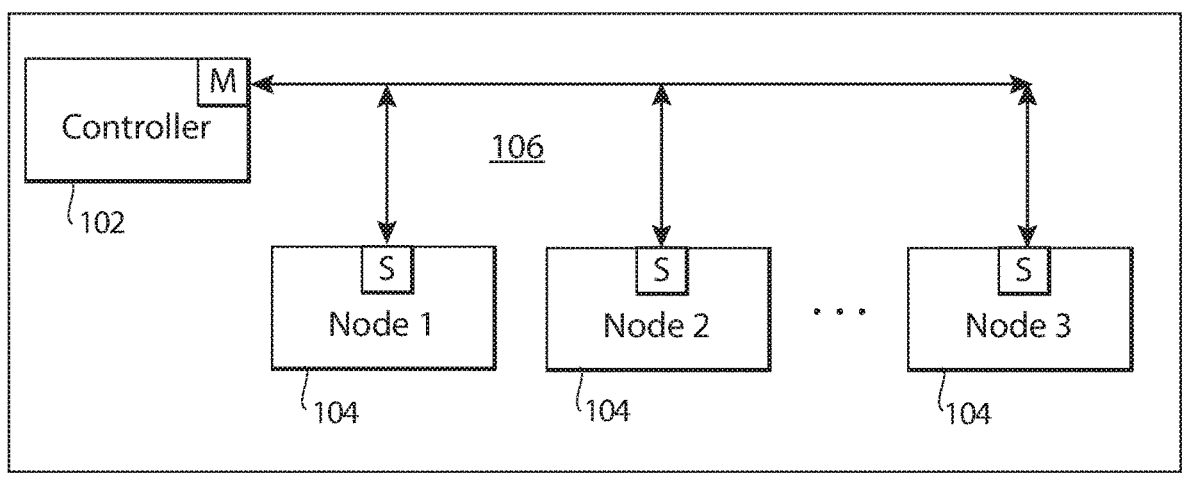
FIG. 1 is a schematic view of an exemplary distributed data acquisition system communication topology in accordance with embodiments of the disclosure.

Bus activity on a communication bus is controlled in which the timing of communication packets occurs at harmonics of a configurable packet interval. The packet interval is a configurable value known to both the master and slave. As part of system setup, the master node and slave nodes' non-volatile memory is updated with communication parameter data items (PDI) which contain the configurable parameters: maximum payload size, baud rate, and packet interval. At reset, the nodes use these parameters to control the communication behavior. Packet interval applies to MOSI channel and MISO channel activity.

The start of the communication packet itself can be used as a reference time to achieve time synchronization among a set of slave nodes. Data transfers are segmented into packets which fit within the configurable packet interval including timing margin. The maximum packet payload size and communication baud rate are configurable parameters which define the maximum expected transmission time for any packet. Timing margin accommodates error sources such as baud rate differences and inter-character gap time. The packet interval is selected to balance synchronization and communication considerations. The data acquisition timing among slave devices can drift over time due to clocking differences. The packet interval needs to occur frequently enough to correct this error. Communication protocol overhead affects data transfer time. The packet interval needs to allow for adequate bandwidth utilization.

In accordance with further aspects of the disclosure, a method of synchronizing communication between a master node and one or more slave nodes of a distributed acquisition system is provided. The method includes defining a packet interval, maximum payload size, and baud rate which provide adequate timing margin to ensure that communication packets can occur at every harmonic of packet interval. With proper selections, these parameters ensure that communication activity is deterministic. In addition, the method includes a configurable provision for managing bus ownership based on packet interval. The master node generates output packets which all slave nodes receive and conditionally consume and conditionally use to update time synchronization based on the start of the packet. If the packet is valid and the packet source address passes specific address criteria indicating that the master generated the packet, all slave nodes use the packet to update time synchronization. Furthermore, if the packet destination address passes specific address criteria indicating that the packet is intended for the slave node and the packet contents matches channel data, the specific slave node consumes any packet payload and schedules any appropriate slave output packet. Channel data consists of port number, data offset, and transaction identification (ID). Port number manages independent data transfers, direction, and priority. Data offset manages data order. Transaction ID helps to distinguish specific transactions and ensure data integrity, especially for cases in which multiple data transfers are pending or active on multiple channels. Matching channel data indicates that data transfers are ordered for a given data transaction. Based on the master output packet, one and only one slave node is granted bus access. Slave bus access needs to be limited so that time synchronization is updated at a minimum rate which depends on master node bus ownership. The protocol uses a bus control parameter to transfer bus ownership for a configurable number of packet intervals. The slave node outputs data starting at the next packet interval for the subsequent set of packet intervals limited to the bus control number specified by the master node. With this approach, time synchronization update and bandwidth utilization are managed in a deterministic manner. The protocol handles all permutations. The slave node transfers bus ownership back to the master early if the end of the data transfer is reached. The protocol includes provisions for data order and integrity checking allowing the master node to recover from communication errors.

In accordance with another aspect of the disclosure a control component of a master node of a distributed acquisition system is provided. The control component includes a processing device configured to capture the start time of communication packet inputs from each slave node relative to the master node's synchronization time, defined as the current harmonic of the packet interval. Based on the time difference, the master node determines the slave specific propagation delay. The master node provides this information to each slave node so that the slave node data acquisition timing can be corrected to accommodate the propagation delay and also be reflected in any future slave to master communication packet. With this approach, the time synchronization error for the distributed acquisition system can be reduced to a negligible level.

Reference will now be made to the drawings wherein like reference numerals identify similar structural features or aspects of the subject disclosure. For purposes of explanation and illustration, and not limitation, a block diagram of an exemplary embodiment of an asynchronous acquisition system in accordance with a first embodiment of the disclosure is shown in FIG. 1 and is designated generally by reference character 100. Acquisition system 100 includes a master node 102 and one or more distributed slave nodes 104 communicating via a bus 106. The bus 106 can be a half-duplex multi-drop 2-wire physical link, with master node 102 couple to a first end of the bus 106 and the slave nodes 104 coupled to second ends of the multi-drops of bus 106. In an example, the bus 106 is an RS-485 physical layer using differential signaling over twisted pairs with signal termination resistors to support effective long distance communication in noisy environments. Tri-state logic allows drivers to be disabled to support multi-drop communication. The RS-485 physical layer drivers and receivers interfaces with a universal asynchronous receiver transmitter (UART) which defines the timing and framing scheme for the data link layer. Shift registers are used to perform parallel-to-serial conversion to output individual bits in a sequential fashion and serial-to-parallel conversion to buffer input bits. The master node 102 can communicate with one or more selected slave nodes 104 or broadcast to all of the slave nodes 104.

Acquisition system 100 can perform remote data acquisition and processing. For example, the slave nodes 104 can be acquisition nodes that sense physical characteristics and transmit sensed data to the master node 102 for aggregation, analysis, data storage, and/or reporting. The master node 102 initiates all bus transactions. For certain transactions, the master node 102 transfers bus ownership to a selected slave node 104 for a specified time period.

In certain applications, data acquisition needs to be highly correlated among the set of distributed slave nodes 104. To accomplish this need, certain acquisition systems have used a synchronization pulse generated by a master node to be used as a time reference for slave nodes. However, this has disadvantages, such as the use of an independent physical link dedicated for time synchronization, which adds cost and weight to such a data acquisition system, and transmissions of data are subject to propagation delays that can affect coherency of the aggregated data.

In the acquisition system 100, the bus 106 itself is used to accommodate both data transfer and time synchronization, which is accomplished by the master node 102 and the slave nodes 104 each employing protocol logic. The protocol logic obviates the need for an independent physical link for time synchronization, reducing cost and weight. The protocol logic further allows for the propagation delay to be measured by the master node 102 and communicated to the slave nodes 104 so that the slave nodes 104 can compensate for the propagation delays to reduce time synchronization error among the slave devices 104.

The acquisition system 100 can use an established time synchronized protocol (TSP), which is a combined network and transport layer protocol based on the Open Systems Interconnection (OSI) model for communication systems. TSP uses acknowledgement and error checking to achieve reliable transmission. TSP further uses segmentation, multiplexing and bus ownership logic to balance data priority, data latency, data transfer efficiency, and time synchronization considerations. In TSP, data is encapsulated within a series of data packets each having a payload portion. TSP further uses a header and footer to manage and route the data transfer. Certain packets known as control packets do not contain a payload portion.

TSP data transfers are mapped to a specific channel to accommodate data priority and data direction considerations. The protocol defines two priorities, high and low. High priority data transfers preempt low priority data transfers at specific times based on bus management logic. High priority transfers are suited for control and status information. Low priority transfers are suited for file transfers. Each channel consists of two ports, one output port and one input port, which indicates the flow of session data contained in the packet payload. The direction is designated as either master out slave in (MOSI) or master in slave out (MISO). For the MOSI channel, only the master node 102 generates data packets containing payload. Conversely, for the MISO channel, only the slave node 104 generates data packets containing payload. For both MOSI channel and MISO channel, control packets containing no payload may be generated. The control packets do not transfer session data; they only supplement data packets in controlling the data transfer itself. The packet header contains a port number parameter which defines the channel. The master node can use a master-out/slave-in (MOSI) channel for sending a session data transmission of master packets from the master node 102 to one or more of the slave nodes 104 to transfer data (write operation) or trigger the buffering of slave data for output (first half of read operation). Using the MOSI channel, the master node 102 can also request status of the data transfer to a specific slave node 104 using a data packet or control packet. In response, the specific slave node 104 acknowledges the progress of the session data transfer using a control packet to allow the master node 102 to recover from possible communication errors. The master node can use the master-in/slave-out (MISO) channel for requesting the slave node to output buffered session data (second half of read operation) using a control packet. In response, if the data is available, the slave node 104 generates data packets containing the requested session data. If the data is not available, the slave node 104 generates a control packet to indicate this possibility. Each channel has an assigned priority for controlling bus activity. If the master node has transferred bus ownership to a specific slave node, the master evaluates any input to determine whether the slave node has transferred bus ownership back to the master node. In addition, the master uses a timeout to handle possible communication errors to retake ownership of the bus.

In an example application, the master node 102 is a controller or host of a network or sub-network of slave nodes 104. The slave nodes 104 can include sensing elements that sense physical characteristics of system in which they are deployed. In response to the sensing, the sensing elements can output sensed data that can be buffered in a buffer of the slave node 104. In an application such as health monitoring of a vehicle such as an aircraft, without limitation to a particular application, the slave nodes 104 can be acquiring sensed data by their sensing elements at a rapid rate. The sensed data can be analyzed by the master node 104 to geolocate a sensed condition. In such an application the slave nodes 104 need to be synchronized in order to accommodate a correlation of the high speed sensed data.

Figure 2:
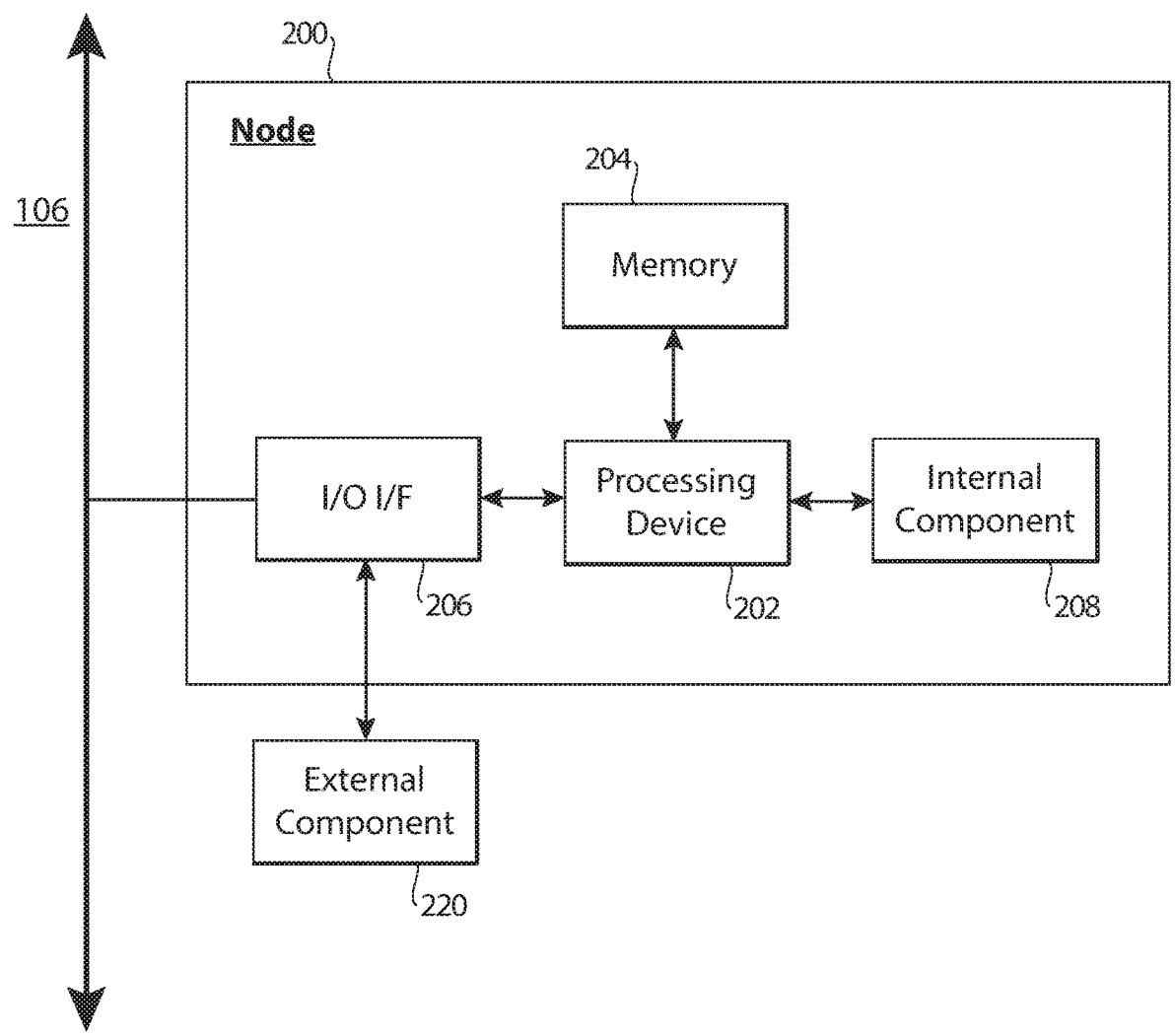
FIG. 2 is a block diagram of an exemplary computer system used by nodes of the distributed data acquisition system in accordance with embodiments of the disclosure.

With reference to FIG. 2, a block diagram of an example node 200 is shown, which provides an example configuration of the master node 102 and the slave nodes 104. Node 200 is only one example of a suitable system and is not intended to suggest any limitation as to the scope of use or functionality of embodiments of the disclosure described herein. Node 200 can be implemented using hardware, software, and/or firmware. Regardless, node 200 is capable of being implemented and/or performing functionality as set forth in the disclosure.

Node 200 is shown in the form of a general-purpose computing device. Node 200 includes a processing device 202, memory 204, an input/output (I/O) interface (I/F) 206 that can communicate with an external component 220, and optionally an internal component 208.

The processing device 202 can be, for example, a programmable logic device (PLD), microprocessor, digital signal processor (DSP), a microcontroller, a field programmable gate array (FPGA), an application specific integrated circuit (ASIC), or other discrete or integrated logic circuitry having similar processing capabilities.

The processing device 202 and the memory 204 can be included in components provided in the FPGA, ASIC, microcontroller, or microprocessor, for example. Memory 204 can include, for example, volatile and non-volatile memory for storing data temporarily or long term, and for storing programmable instructions executable by the processing device 202.

The I/O I/F 208 can communicatively couple to bus 106. In addition, I/O I/F 108 can include an interface to couple to one or more external components 220, an external sensing element, a keyboard, a pointing device, a display, another computing device, and/or a local or wide area network, such as the Internet, e.g., via a connector, near frequency communication, and wired or wireless communication. For example, the slave node 104 can couple to bus 106 via I/O I/F 206, and possibly to an external sensing element. The master node 102 can couple to bus 106 via I/O I/F 206, and possibly to a remote database to upload data received from the slave nodes 102.

As for slave node 104, the internal component 208 can include, for example, a sensing element, an analog/digital (A/D) converter, and/or a signal conditioning (SC) circuit. The sensing element can sense, for example, physical characteristics of its environment, such as temperature, vibration, speed, acceleration, displacement, humidity, pressure, or other characteristics. The sensing elements can be analog or digital, and can have the ability to perform analog/digital conversion, some signal conditioning, and/or some preprocessing.

With reference to operation of the acquisition system 100, TSP timing used by the acquisition system 100 is determined by configurable data (payload size, baud rate, and packet interval). The payload size is the maximum number of bytes of payload allowed per packet. This value bounds the expected time to transmit a packet. Baud rate defines the communication speed in terms of symbols per second. For UART based communication, the symbols include the data bits along with the overhead bits such as the start bit and stop bit. The maximum packet payload size and baud rate define the maximum expected transmission time for any packet.

Packet interval defines the time between successive packets from the master node 102 to the slave node 104 or from the slave node 104 to the master node 102. Bus activity is controlled in which the timing of communication packets occurs at harmonics of the configurable packet interval. In this manner, the start of the master's output communication packet itself can be used as a reference time to achieve time synchronization among a set of slave nodes.

$$\text{packet interval} = \frac{(\text{max payload size} + \text{overhead bytes}) \times \text{symbols per byte}}{\text{baud rate}} + \text{timing margin}$$

Data transfers are segmented into packets which fit within the configurable packet interval including timing margin. Timing margin accommodates error sources such as baud rate differences and inter-character gap time. In addition, timing margin accommodates processing delay when transitioning between control of the bus by the master node or slave node to the other of the master node and slave node.

As an example, with a TSP protocol overhead of 20 bytes and a UART configuration of 10 symbols per bytes (1 start bit, 8 data bits, 1 stop bit) and a timing margin of 40 us, the configurable parameters could be selected as follows: maximum payload size of 460 bytes, baud rate of 5 Mbaud, packet interval of 1 ms.

Baud rate error can be due to clock differences between master and slave. The timing margin accommodates these baud rate errors.

UART inter-character gap time is defined as the time between the stop bit and the subsequent start bit within one packet. It can be a source of significant timing variation. However, with hardware buffer mechanisms, such as a first-in-first-out (FIFO) memory interface, the UART inter-character gap time is expected to be zero. The producer can easily avoid an underflow case when transferring bytes to the UART, which will generate a continuous output as long as the data is buffered. With this knowledge, packets can be transmitted by the master node 102 at the periodic deterministic packet interval, since the packet interval infers deterministic bus activity and facilitates deterministic behavior for interfacing with UART hardware. However, it is good practice for the master node 102 to check that the UART interface (FIFO or shift register) is empty before writing a new packet to its output port which triggers transmission on the bus 106. If the packet interval has been exceeded, indicated by the UART interface being not empty, the transmission should be sent at the beginning of the next interval.

The delays when transitioning between control of the bus from master node 102 to one of the slave nodes 104 or from one of the slave nodes 104 to master node 102 are attributed to the time to filter and verify whether the packet contents are intended for the receiver. Filtering can be the process of using the addressing scheme to determine if the transmission is intended for the receiver. Verifying can be the process of evaluating content of a received transmission and comparing the contents with latched channel data. The packet interval can be used to a) define the timing that will be used by the master node 102 for generating all master output packets, b) define timing used by the slave nodes 104 for generating all slave output packets, c) synchronize the slave nodes 104 for data acquisition, d) control ownership of bus 106, and/or e) enable the master node 102 to determine propagation delay for slave nodes 104 in order to correct data acquisition timing with feedback reflected in slave nodes 104 generated output.

With regard to defining the timing used by the master node 102 to transmit packets, the master node 102 controls its output to start at harmonics of the packet interval. This means that all start times of master packets are multiples of the packet interval.

With regard to defining the timing used by the slave nodes 104 for transmitting packets, each slave node 104 captures the start time for all master node 102 packets and schedules its output to coincide with subsequent harmonics of packet interval relative to the captured start time offset by the slave specific propagation delay.

With regards to providing synchronization among the slave devices 104, the slave nodes 104 use the captured start time for all master node 102 packets to trigger data acquisition synchronization events to coincide with subsequent harmonics of packet interval relative to the captured start time offset by the slave specific propagation delay.

Synchronization of the slave nodes 104 is an optional protocol feature that is dependent on the ability of the master node 102 and individual slave node's ability to perform the synchronization. The protocol does not break based on the mix of node types or synchronization capabilities. Some slave nodes 104 may synchronize their data acquisition and/or their output packets, whereas other slave nodes 104 may not have that capability.

When time synchronization is supported, the slave node 104 schedules its output to start at a calculated synchronization time, also referred to as sync time. The master node 102 expects to start receiving the packet at a harmonic of its packet interval offset by the slave-to-master propagation delay, one-half of the round trip propagation delay. To achieve this timing, the slave node 104 timestamps the start of a received master output packet and calculates a start time for outputting a response output packet by adding the packet interval and subtracting the master-to-slave propagation delay. The propagation delay is measured by master node 102 for the individual slaves and conveyed to the respective slave nodes 104. The packet interval defines the fundamental time between successive master packet start times and slave packet start times, meaning all master packets and all slave packets are output at multiples of the packet interval, with synchronization provided when any master packet is received by any slave node 104.

When time synchronization is not supported, the slave node's 104 output is started immediately after packet disposition, which is limited to a minimum and a maximum delay time. For successive data transfers by the slave node 104, the slave node's 104 output is scheduled to be a multiple of the packet interval after the start of the first output by the slave node 104. In embodiments, the packet interval bounds the time between the master node's 102 last packet end time and the slave node's 104 first packet start time. The maximum delay is (1.n×packet interval), which corresponds to a software implementation, wherein n is selected to accommodate servicing the communication interface at the packet interval with an n % margin. In embodiments, n=2. The minimum delay corresponds to a firmware implementation, contingent on the physical configuration, for example a delay of 10 µs.

With regards to controlling bus ownership, the master node 102 can use the packet interval to control transfer of bus ownership to slave nodes 104 for a limited time period for either acknowledging receipt of a transmission or for sending data in response to a request from the master node 102. This control of bus ownership, reflected in the packet bus control value contained within the packet header, defines the duration for which a slave node 104 can use the bus, e.g., in terms of packets. From the perspective of a slave node 104, the master node 102 defines control of the bus 106, and the slave node 104 just does what it is told to do by the master node 102. After ownership of bus 106 is transferred to a slave node 104, the master node 102 reclaims bus ownership after the slave node 104 indicates that its output is complete or the slave node's control expires, whichever occurs first. The slave node 104 transfers bus ownership back to the master node 102 by using the same packet bus control value contained within the packet header. When input packets from the slave node 104 are dispositioned, the master node 102 updates bus ownership based on this value. After the master node 102 reclaims bus ownership, it can output its next transmission at the next available packet interval.

For slave nodes 104, if an unexpected occurrence occurs that delays the slave node's transmission during the time period that control of bus 106 is transferred to the slave 104, bus ownership is relinquished back to the master node 104 when the slave node outputs its next transmission independent of the control period provided by the master node 104. The master node 102 can also use a timeout for receiving input from the slave node 104 to accommodate such as situation or other communication errors.

The transfer of bus ownership can be performed by setting a bus control value in a transmission from the master node 102 to the slave node 104. The 8-bit bus control value, limited between 0 and 255, indicates the number of successive packet intervals in which the slave node 104 is allowed to generate output. Upon receipt of a non-zero bus control value, the slave node 104 enables output packets for a count corresponding to the bus control value. Since time synchronization updates are not possible while a slave node 104 owns the bus 106, timing error and bandwidth utilization need to be considered when selecting the maximum allowed bus control value. The slave node 104 uses the 8-bit bus control value, but the allowed values are 0 or 1. If the slave node 104 has ownership of the bus 106, the slave node 104 transfers bus ownership back to the master node 102 when the bus control value is 1 and retains bus ownership if the bus control value is 0.

When the master node 102 transfers bus ownership to a specific slave node 104, such as by requesting a status or requesting acquired data from the slave node 104, the slave node 104 schedules its first output to start at the next synchronization time if time synchronization is supported or to start immediately after packet disposition if time synchronization is not supported.

With regards to determination of the propagation delay, when the output of a slave node 104 is synchronized with the master node's 102 output by capturing the time reference and predicting the next synchronization time based on the packet interval, the master node 102 is able to measure the propagation delay to that slave node 104. The master node 102 can then report the propagation delay to the slave node 104. The slave node 104 can then use the propagation delay to compensate for the timing of its transmissions, thus reducing timing errors that could interfere with synchronization between the slave nodes 104 or synchronization between the slave node 104 and the master node 102.

In embodiments, constraints can be applied to the configurable data for TSP timing, in order to meet design considerations, such as minimum and maximum and resolution values for each of payload, baud rate, and packet intervals and their allowed resolution. For example, the resolution for packet intervals can be sync event, wherein sync event is a design specific timing for data acquisition activity, such as toggling buffers. Baud rate can cover a targeted range of data rates based on hardware clocking restrictions, transceiver capability, and signal integrity considerations. A maximum payload constraint can allow for some flexibility to balance overhead, bandwidth utilization, and packet buffer size. A multiple of 4 bytes can simplify cyclical redundancy check (CRC) calculation. Further, timing margin constraints can be provided that accommodate timing variations.

With regard to operation of the master node 102, the master node 102 sends transmissions to the slave nodes 104 with the start of each transmission spaced by a multiple of the packet interval. The master node 102 controls ownership of the bus 106, allowing the bus 106 to be used for only its transmissions, unless it has sent a request to a slave node 104 for a status or specified data. The master node 102 allows the slave node 104 to control the bus 106 for a specified number of intervals to reply with the requested data, after which the master node 102 resumes control of the bus 106. In embodiments, the master node 102 can wait for the slave node's response, allowing the response to span the specified number of intervals. The master node 102 can apply a timeout feature to resume its control of bus 106 in the event that a communication error occurred.

When synchronization is applied, the master node 102 can transmit a master packet to a slave node 104 requesting an acknowledgment, and substantially at the same time grant the slave node 104 ownership of the bus 106. The master node 102 can grant the slave node 104 ownership of the bus sufficient to allow the slave node 104 to reply to the request, and then regain ownership of the bus 106. The master node 102 can expect an acknowledgment in a response from the slave node at a certain time, e.g., the start of the next packet interval in a firmware or hardware embodiment, or the start of a second packet interval in software embodiments. The master node 102 can determine a propagation delay based on the difference between the expected response receipt time and the actual response receipt time. The master node 102 can transmit the determined propagation delay to the slave node 104 via the bus 106.

In an embodiment in which the slave nodes 104 are configured to synchronize their data acquisition and/or output of transmissions with the master node's 102 transmissions, the slave node 104 monitors the bus 106 for a transition from an inactive state in which no transmissions are being transmitted to an active state in which a transmission is being transmitted. Regarding operation of the master node 102, it can control bus ownership and output MOSI transmissions to the various slave nodes 104. To ensure a minimum synchronization rate, the master node 102 can send its output transmissions within a maximum allowed delay. The master node 102 can further conditionally output control packets when no data transactions are pending to assure that synchronization can be maintained when no data transfers are necessary. In this way, all master packets can be used by each slave node 104 to correct its sync time. Correction of sync time can be a continual process, even when propagation delays are changed based on installation and cabling modifications of the acquisition system 100 and/or changes in the environment.

Regarding operation of the slave nodes 104 for determining a sync time to use for synchronizing data acquisition and/or generating output packets, when a master output packet is received via bus 106, each slave node 104 routes the input transmission to its receiver (e.g., in this example, a UART) input for decoding. In addition, the input transmission is routed to a capture port which evaluates the signal transitions in order to timestamp the start of a new packet. The slave node 104 takes advantage of an expected inter-character gap time of 0 and a minimum inter-packet time, e.g., 10 µs to wait for a particular condition in which the slave node 104 detects at least a threshold amount of time of an inactive input state (during which the bus 106 is inactive) followed by a transition to an active input state (during which the bus 106 transitions to being active). Since UARTs are configured to use a non-return to zero (NRZ) encoding scheme, in this example, the inactive condition is defined as logic level high. The active transition is defined as the transition from logic level high to logic level low.

In embodiments, detection of the predetermined condition is performed by initializing a transition inactive time counter to zero, and incrementing the counter as long as the input state remains inactive. Once a timeout occurs, meaning the inactive input state persisted for the threshold amount of time (wherein the threshold is a timeout value), the slave node 104 waits for the input state to transition to active (logic level low). Until the timeout occurs, the counter is reset if the input state becomes active.

When the transition is detected, meaning a packet is being received from bus 106, the slave node 104 captures the current time corresponding to the start of the packet, referred to as start time (t_k). The current time can be captured from a free-running timer, wherein the timer's count value is latched, e.g., by firmware of the slave node 104.

As bytes of the packet are received, the slave node 104 evaluates validity of the packet and determines whether the packet is a transmission form the master node 102 (regardless of which slave node 104 it is destined for). If the packet is from another slave node 104 it can be ignored, and the latched time is not used. If the packet is from the master node 102, a sync time (t_s) is corrected based on Equation (1):

$$t\_s = t\_k + t\_p - t\_\text{prop}, \quad (1)$$

where (t_p) is the configurable packet interval and (t_prop) is a slave specific propagation delay provided by the master. The slave node 104 uses the sync time to control the timing of its data acquisitions and output transmissions.

When the slave node 104 receiving a master node 102 output packet in which data is pushed to the slave node 104, the slave node 104 buffers the packet. When the full packet is received, the slave node 104 dispositions the packet based on its content and in accordance with predetermined criteria. If the packet is invalid or not intended for the slave, the packet is ignored, other than for determining sync time. If the packet is valid and intended for the slave node 104 (as indicated by the destination address in the packet's header), the slave node 104 initializes transaction data for the specific channel by which the packet was received and maintains the data based on subsequently received packets. The transaction data includes port number, data offset, transaction ID, and source/destination addresses for the specific channel. If the data is in order, the slave node 104 buffers the data and updates data offset. At the session layer, the buffered data is evaluated and consumed, if complete.

In operation when the master node 102 transfers bus ownership to the slave node 10, e.g., via write operation status request or read operation pull request, the next transmission output from the slave node 104 is scheduled to start at a future time or is started immediately after packet disposition. If time synchronization is not supported, the slave output is started immediately after packet disposition, as limited by the minimum and maximum delay times. Successive slave data transfers are scheduled at multiples of packet interval.

If time synchronization is supported, the transmission output is scheduled to start at the calculated sync time in which the master node 102 is expected to start receiving the packet at a harmonic of its packet interval.

At reset, the free-running timer is started in which its "count value" represents the current time t_c. Reset, which initializes the free-running timer, can be a power on reset, hardware reset such as from supervisor circuit or watchdog circuit, or controller initiated reset such as a from software or firmware action. Additionally, sync time is updated using the current time based on Equation (2):

$$t\_s = t\_c + t\_p - t\_\text{prop}, \quad (2)$$

where t_p is the packet interval and t_prop is a specific propagation delay that the master node 102 provided to the slave node 104.

When the current time reaches the sync time, the acquisition process is updated depending on the mode of operation. For example, if a buffering scheme is used, the slave node 104 may toggle its active buffer. In a scenario in which each applicable slave node 104 (the slave nodes 104 addressed by a multicast of broadcast the instruction to perform the acquisition process) is synchronized to perform this action at nearly the same time, the acquired data is time synchronized at the start of each buffer. Among the buffers of the applicable slave nodes 104, a slightly different number of acquired samples can be contained in the buffer, which can be accommodated during processing or data aggregation by the master node 102. For example, the datasets could be truncated to the length of the minimum dataset.

The slave node 104 starts to output the buffered data conditionally based on whether it is scheduled. Depending on the priority of the channel and whether previous output of the channel (if any) has been completed as expected, successive output may be scheduled to occur.

With reference now to FIGS. 3A-9, shown are flowcharts and flow diagrams demonstrating implementation of the various exemplary embodiments. It is noted that the order of operations shown in FIGS. 3A-9 is not required, so in principle, the various operations may be performed out of the illustrated order or in parallel. Also certain operations may be skipped, different operations may be added or substituted, or selected operations or groups of operations may be performed in a separate application following the embodiments described herein.

Figure 3A:
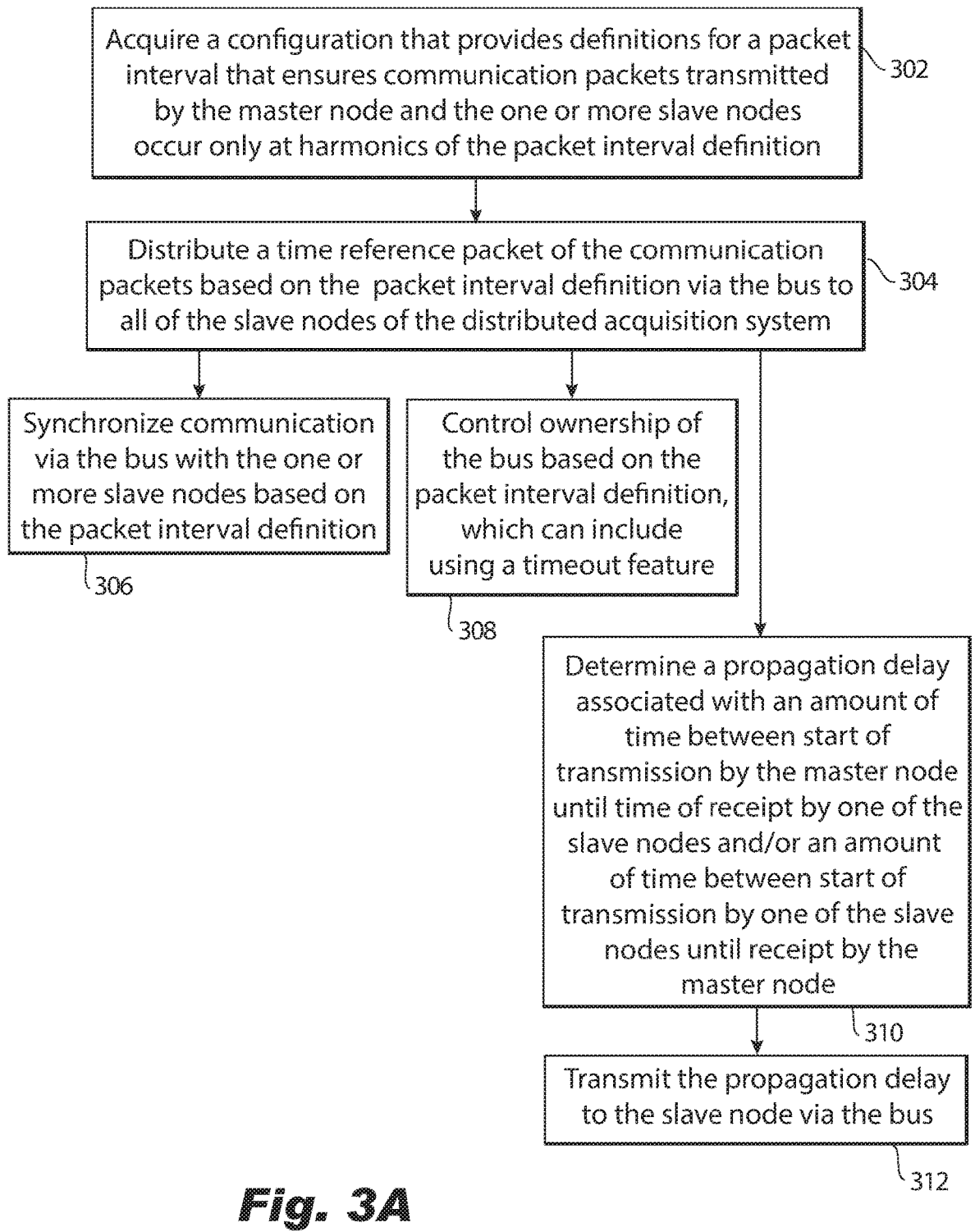
FIG. 3A is a flow diagram showing an example method performed by a master node for communicating with one or more slave nodes in a distributed data acquisition system in accordance with embodiments of the disclosure.

FIG. 3A shows a flow diagram 300 that illustrates an example method performed by a master node of an acquisition system, such as master node 102 of acquisition system 100 shown in FIG. 1. At input 302, a configuration is acquired that provides a definition for a packet interval, wherein the packet interval definition provides an adequate timing margin to ensure communication packets transmitted by the master node and the one or more slave nodes occur only at harmonics of the packet interval definition. In other words, data transfers are segmented into packets which fit within the configurable packet interval including timing margin. At operation 304, a time reference of the communication packets is distributed via the bus to all of the slave nodes of the distributed acquisition system, wherein the time reference is based on the packet interval definition. Specifically, the start of the master's output communication packet itself can be used as a reference time to achieve time synchronization among a set of slave nodes. The method can be continued with operations 306, 308, and/or 310.

At operation 306, communication via the bus is synchronized with the one or more slave nodes based on the packet interval definition.

At operation 308, ownership of the bus is controlled based on the packet interval. In embodiments, a timeout feature can be used to regain control of the bus after providing control of the bus to one of the slave nodes. Effectively, bus activity is controlled in which the timing of communication packets occurs at harmonics of a configurable packet interval.

At operation 310, a propagation delay is determined, wherein the propagation delay is associated with an amount of time between start of transmission of a communication packet transmitted by the master node until time of receipt of the communication packet by one of the slave nodes and/or an amount of time between start of transmission of a communication packet transmitted by one of the slave nodes until receipt of the communication packet by the master node. At operation 312, the propagation delay is transmitted to the slave node via the bus.

In embodiments, one or more of operations 306, 308, and/or (310 and 312) can be performed at different times, in different orders, or at the same time.

In embodiments, the bus 106 is used for two-way communication. The control component further controls ownership of the bus based on the packet interval definition.

In embodiments, the one or more slave nodes includes a plurality of slave nodes, and controlling ownership of the bus includes granting limited access to the bus for a single selected slave node of the plurality of slave nodes.

In embodiments, the limited access granted is for a specified number of packets that are allowed to be transmitted by the selected slave node while the selected slave node is granted access to the bus.

In embodiments, the bus is configured for two-way communication, the packet interval definition is a maximum expected time between successive transmission start times of communication packets transmitted by the master node, and the control component expects communication packets transmitted by the one or more slave nodes to be synchronized based on the packet interval definition.

In embodiments, the packet interval definition accommodates a maximum expected transmission time for transmitting the communication packets transmitted by the master node or the one or more slave nodes based on maximum packet payload size and communication baud rate definitions of the acquired configuration.

In embodiments, each packet of the time reference packets and the communication packets transmitted by the master node to any of the slave nodes has a start time that is a multiple of the packet interval definition.

In embodiments, the packet interval definition is based on delays caused by at least one of baud rate error due to clock differences between the master node and the at least one slave node, processing when transitioning between control of the bus by the master node or slave node to the other of the master node and slave node, and sum of intercharacter timing gaps.

Figure 3B:
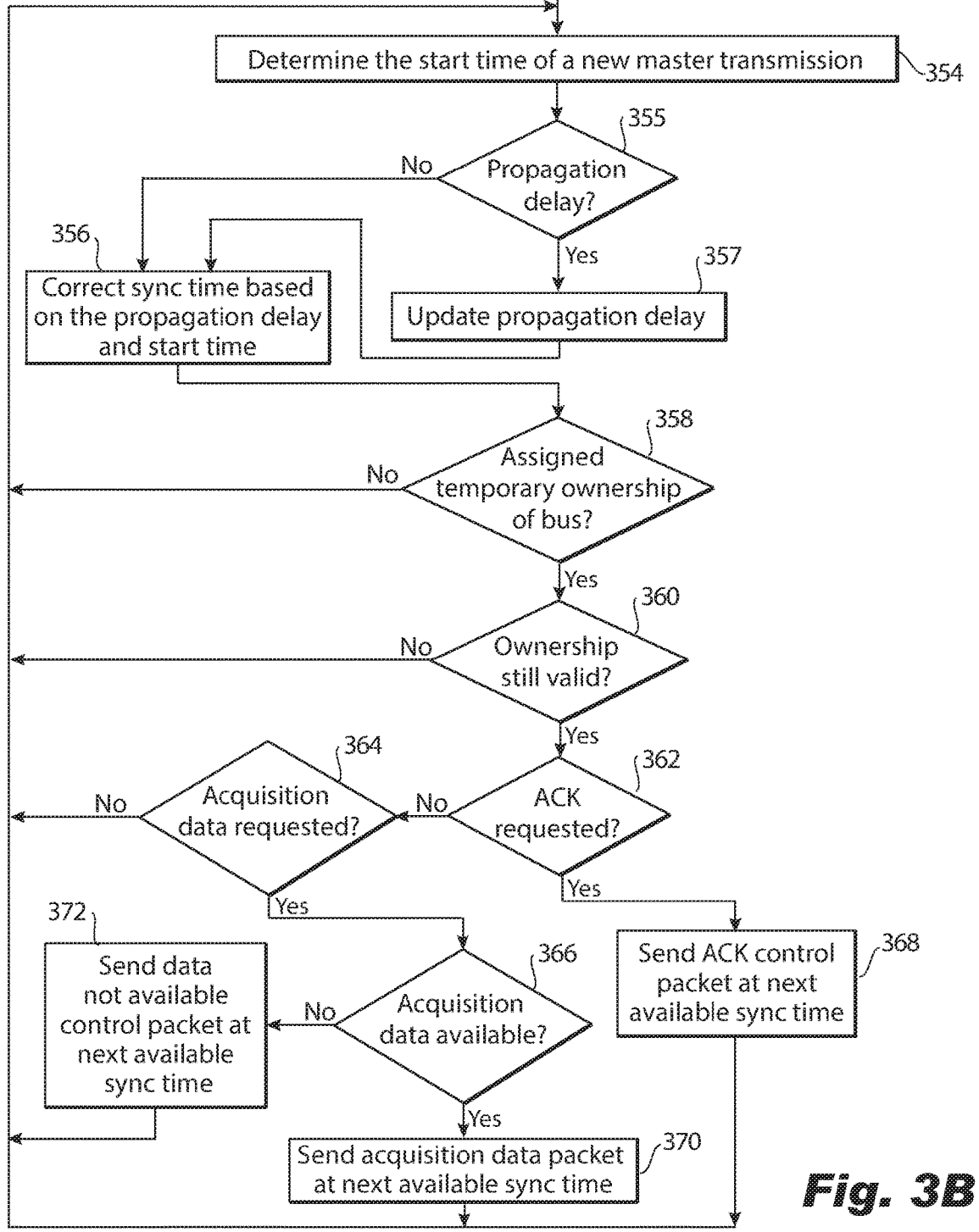
FIG. 3B is a flow diagram showing an example method performed by a slave node for communicating with the master node in a distributed data acquisition system in accordance with embodiments of the disclosure.

FIG. 3B shows a flow diagram 350 that illustrates an example method performed by a slave node of a plurality of distributed slave nodes of an acquisition system, such as slave node 104 of acquisition system 100 shown in FIG. 1. At input 352, a configuration is acquired that provides definitions for a packet interval that ensures communication packets transmitted by the master node and the one or more slave nodes occur only at harmonics of the packet interval definition. At operation 354, the start time of a new master transmission is determined.

Next, at operation 355, a determination is made whether the master transmission includes the propagation delay that was measured by the master node for the particular slave node. If the determination at operation 355 is YES, meaning the master transmission includes the slave node's particular propagation delay as determined by the master node, then at operation 357 the slave node latches the updated propagation delay, after which the method continues at operation 356. If the determination at operation was NO, meaning that the master transmission did not include propagation delay, then at operation 356, the slave node corrects its sync time based on the latched propagation delay and the start time of the master transmission. When the master node does not have particular messages that it needs to send in transmissions, it can send synchronization messages that the slave node can use for correcting its own synchronization by correcting sync time.

At operation 358, a determination is made whether temporary ownership of the bus of the acquisition system has been assigned to the slave node. If the determination at operation 358 is YES, meaning that ownership of the bus has been temporarily assigned to the slave node, e.g., for a fixed amount of time or number of packet intervals, a determination is made at operation 360 whether the slave's ownership of the bus is still valid. If the determination at operation 358 is NO, meaning that ownership of the bus is not assigned to the slave node, then the method continues at operation 354.

If the determination at operation 360 is YES, meaning the slave's ownership is still valid and has not lapsed, then at operation 362 a determination is made whether the master node has requested an acknowledgement (ACK). If the determination at operation 360 is NO, meaning slave's ownership of the bus is no longer valid, e.g., has lapsed, then the method continues at operation 354. If the determination at operation 362 is YES, meaning an acknowledgment has been requested, then at operation 368 the slave node transmits the acknowledgement at the next available sync time, each sync time being spaced by the packet interval. The master node can then use its receipt time of the acknowledgment to determine propagation delay for the slave node. Next, the method continues at operation 354.

If the determination at operation 362 is NO, meaning an acknowledgment has not been requested, then at operation 364 a determination is made whether acquisition data is requested by the master node. If the determination at operation 364 is YES, meaning acquisition data has been requested, then at operation 366 a determination is made whether there is acquisition data available. Such available acquisition data may be buffered and waiting to be sent to the master node based on a prior request (first half of read transaction). If the determination at operation 364 is NO, meaning acquisition data has not been requested, then the method continues at operation 354.

If the determination at operation 366 is YES, meaning that acquisition data is available, then at operation 370, the slave node transmits the acquisition data at the next available sync time. Next, the method continues at operation 354. If the determination at operation 366 is NO, meaning that acquisition data is not available, then at operation 372, the slave node transmits a control packet to indicate that the data is not available. With this input, the master node knows that the slave node needs more time to buffer the requested data. The method continues at operation 354.

Figure 4:
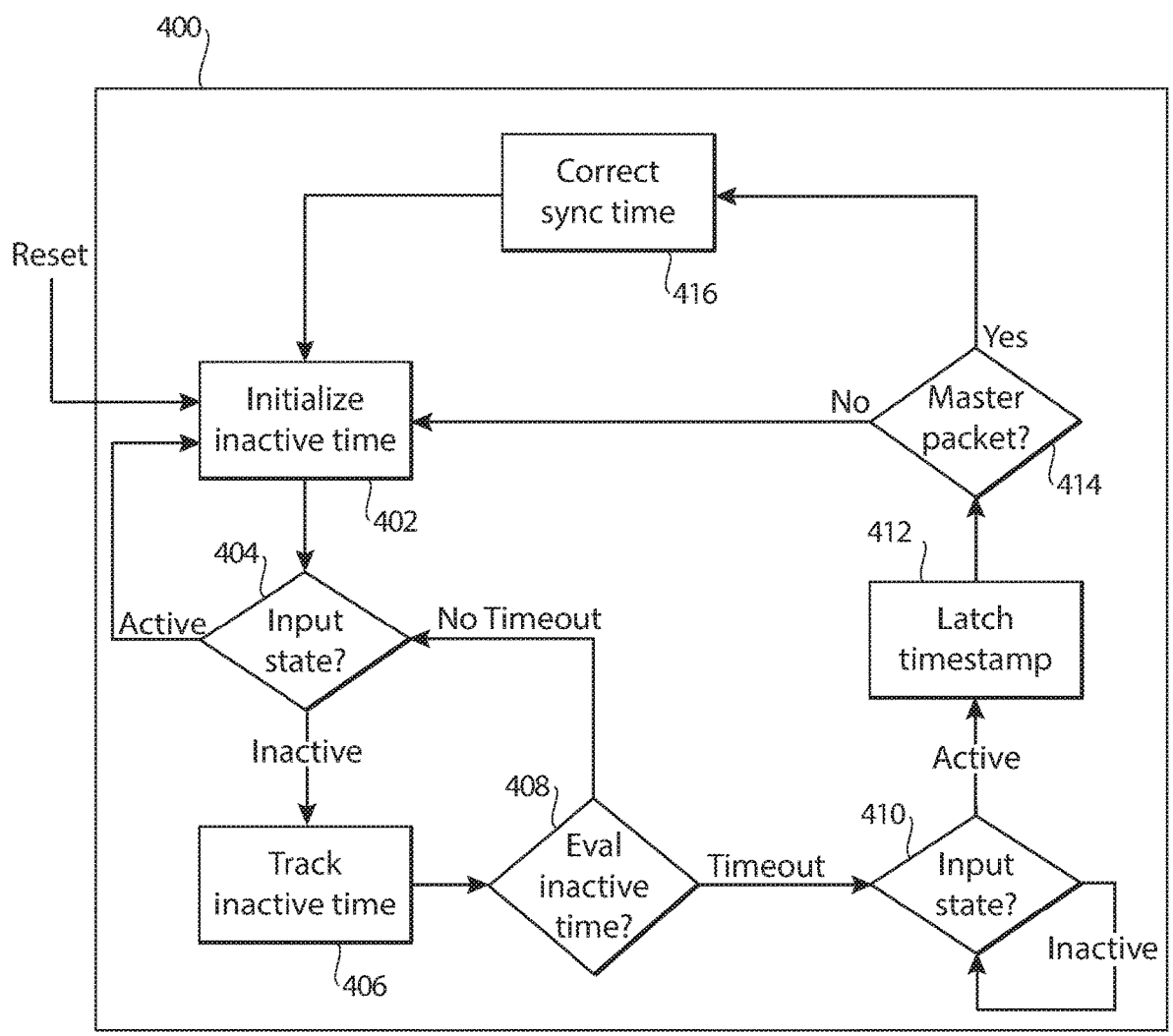
FIG. 4 is a flow diagram showing an example method performed by a slave node of a distributed data acquisition system for implementing example time synchronization protocol correction logic in accordance with embodiments of the disclosure.

FIG. 4 shows a flow diagram 400 that illustrates an example method for synchronizing a slave node performed by a slave node of an acquisition system, such as slave node 104 of acquisition system 100 shown in FIG. 1. At operation 402, an inactive time counter is initialized in response to either a reset signal or an ACTIVE input from operation 404. At operation 404 a determination is made whether the slave node input state is active or inactive. If the input state is active, control returns to operation 402 and the inactive time counter is reset to zero. If the input state is inactive, the method continues at operation 406. At operation 406, the inactive timer is incremented. At operation 408, the inactive time count value is evaluated to determine whether it has exceeded a threshold value. When the threshold value has been exceeded, a timeout condition is determined to have occurred. If the timeout condition has not occurred, meaning the inactive time counter did not exceed the threshold value, then control is returned to operation 404. If the timeout condition has occurred, the method continues at operation 410.

At operation 410 a determination is made again whether the slave node input state is active or inactive. Operation 410 is performed while the inactive timer continues to be incremented. If the determination is that the input state is inactive, operation 410 is repeated while the inactive time counter continues to be incremented. If the input state is determined to be active, the method continues at operation 412 in which a timestamp of the current time e.g., captured from the free-running timer, is latched. The free-running timer's count value represents the current time t_c. At operation 414 a determination is made whether an incoming packet received while in the active input state is a valid master output packet.

If the determination at operation 414 is NO, meaning the incoming packet is not a master packet, but is therefore from another slave node 104, then control continues at operation 402 for re-initialization of the inactive timer to zero. The input packet is ignored for the purposes of correcting sync time (t_s), and the latched time is not used. If the determination at operation 414 is YES, meaning that the incoming packet is a valid master packet, then operation continues at operation 416. At operation 416 sync time (t_s) is corrected based on Equation (1) above. The slave node can then use the corrected sync time (t_s) to control timing of data acquisitions and output transmissions by the slave node.

Figure 5:
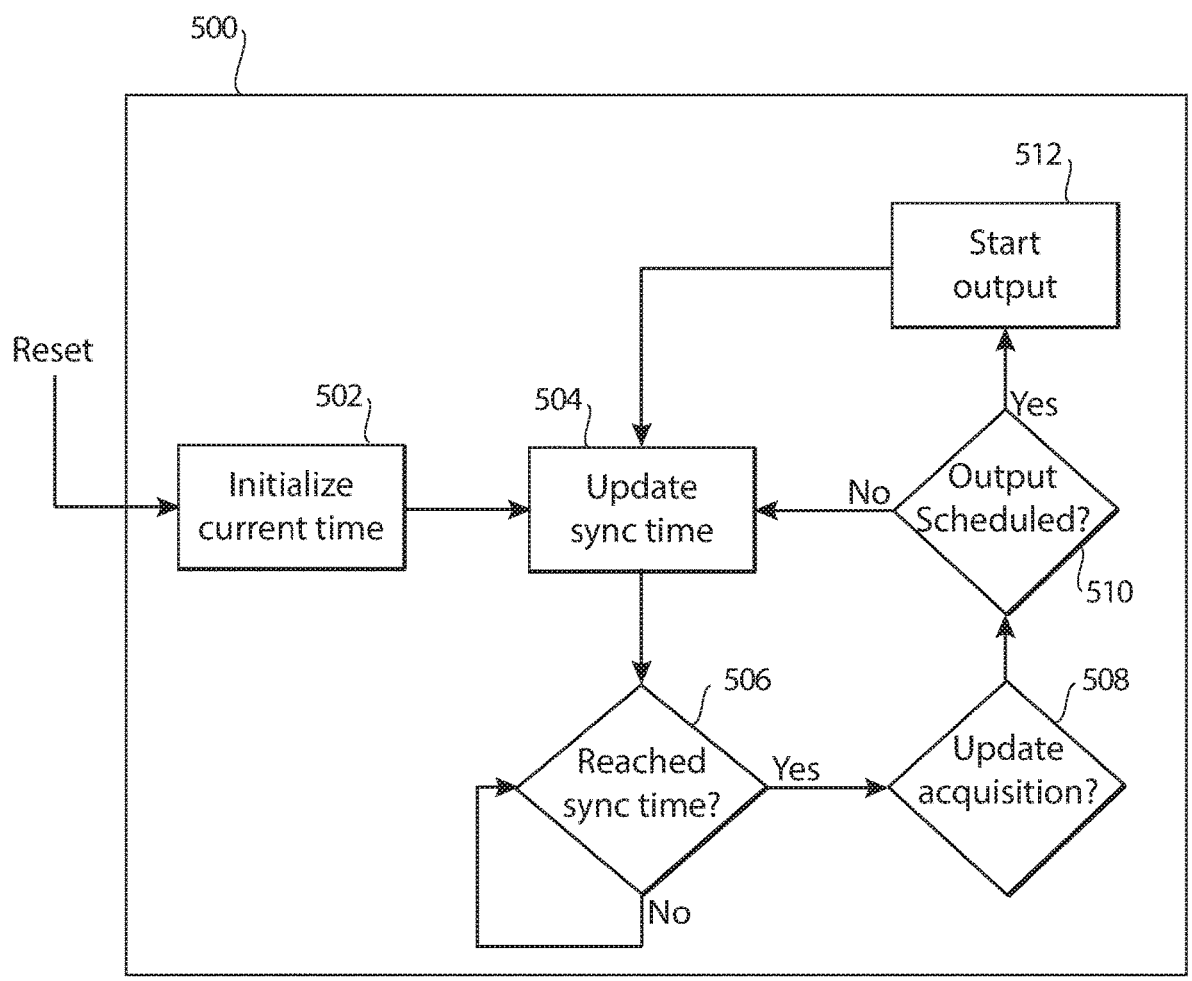
FIG. 5 is a flow diagram showing an example method performed by a slave node of a distributed data acquisition system, for implementing example time synchronization protocol functional logic in accordance with embodiments of the disclosure.

FIG. 5 shows a flow diagram 500 that illustrates an example method performed by a slave node of an acquisition system, such as slave node 104 of acquisition system 100 shown in FIG. 1, for applying sync time (t_s) to synchronize operation of the slave node. At operation 502, the free-running timer, is initialized to the current time t_c. The value of the free-running timer is incremented over time, representing updated current time. At operation 504, sync time (t_s) is updated using the current time t_c, based on Equation (2).

At operation 506, a determination is made whether the free-running timer value (which is the updated current time) has reached the sync time t_s. If the determination is NO, meaning the free-running timer value has not yet reached the sync time t_s, then operation 506 is repeated as the free-running timer is incremented based on passing time. When the determination is YES, meaning the free-running timer value has reached sync time t_s, the method continues at operation 508. At operation 508, if the sensor node is in an acquisition mode of operation, an acquisition is updated, such as by toggling its active buffer. Operation 508 should be synchronized for other slave nodes that are communicating with the master node.

At operation 510, a determination is made whether an output is scheduled. Output is scheduled when the slave node is given control of the bus by the master node, such as to send an acknowledgement or to reply with requested data, such as acquired data, If the determination at operation 510 is NO, meaning output is not scheduled for the slave node, then the method continues at operation 504 for updating sync_time. If the determination at operation 510 is YES, meaning output is scheduled for the slave node, then the method continues at operation 512, after which the method continues at operation 504. At operation 512, a transmission procedure is performed for outputting the requested data or acknowledgement.

Figure 6:
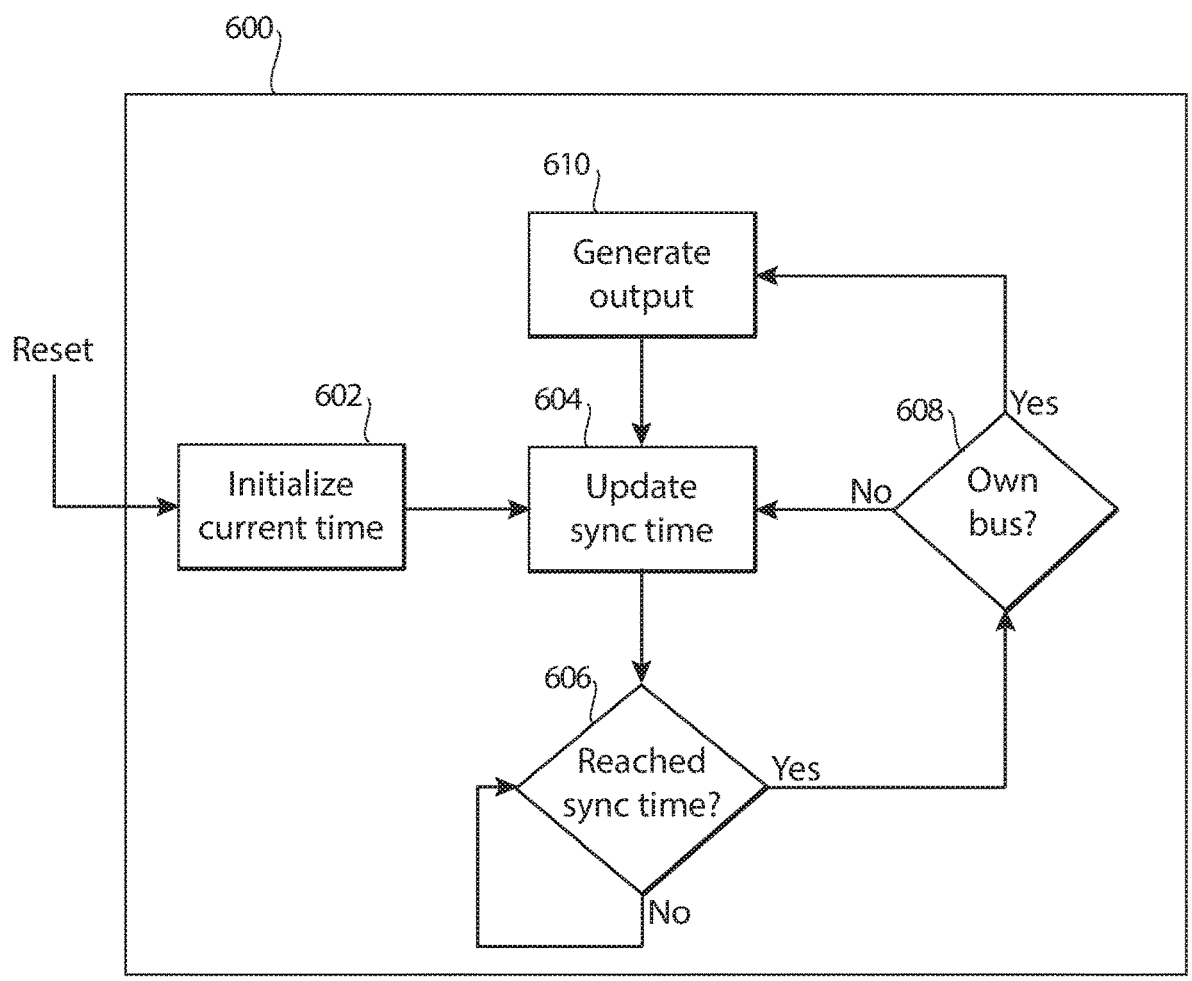
FIG. 6 is a flow diagram showing an example method performed by a master node of a distributed data acquisition system for implementing example time synchronization protocol functional logic in accordance with embodiments of the disclosure.

FIG. 6 shows a flow diagram 600 that illustrates an example method for function of a master node of an acquisition system, such as master node 102 shown in FIG. 1 for synchronizing timing with slave nodes of the acquisition system. At operation 602, sync time (t_s) is initialized and the value of the free-running timer is incremented over time, representing updated current time. At operation 604, sync time (t_s) is updated where t_s=t_c+t_p, where t_p is the configurable packet interval.

At operation 606, a determination is made whether the free-running timer value (which is the updated current time) has reached the sync time t_s. If the determination at operation 606 is NO, meaning the free-running timer value has not yet reached the sync time t_s, then operation 606 is repeated as the free-running timer is incremented based on passing time. When the determination at operation 606 is YES, meaning the free-running timer value has reached sync time t_s, the method continues at operation 608.

At operation 608, a determination is made whether the master node owns the bus of the acquisition system, such as bus 106 shown in FIG. 1. If the determination at operation 608 is NO, meaning the master node does not own the bus, then the method continues at operation 604 for updating sync_time. If the determination at operation 608 is YES, meaning the master owns the bus, then the method continues at operation 610, after which the method continues at operation 604. At operation 610, the master node generates output. The master determines what to output by resuming any active high priority output. Otherwise, the master node starts any pending high priority output. Otherwise, the master node resumes any active low priority output. Otherwise, the master node starts any pending low priority output. Otherwise, if data acquisition is active, the master node outputs a synchronization packet which contains no payload and only serves to provide a time synchronization update.

Figure 7:
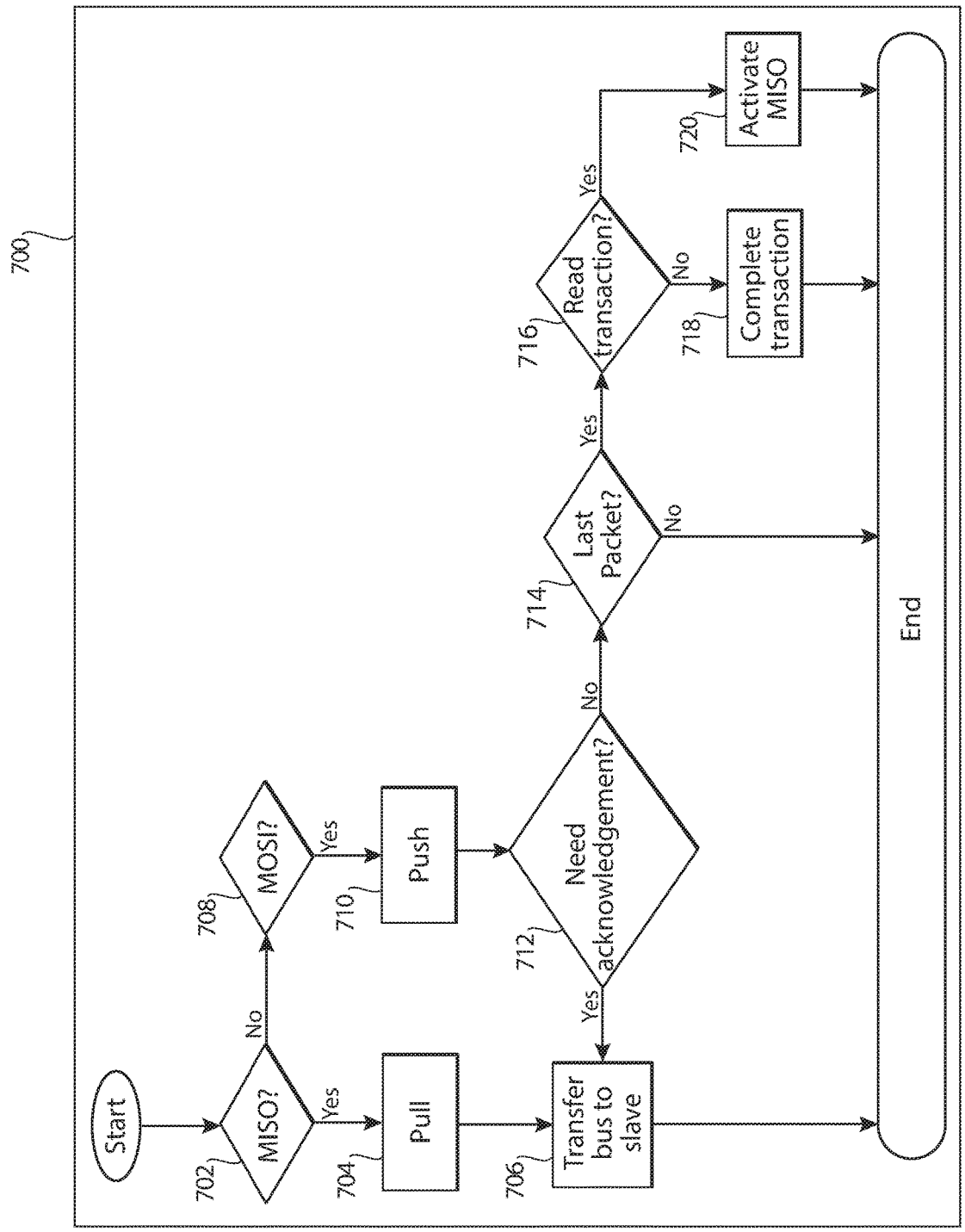
FIG. 7 is a flow diagram showing an example method performed by a master node of a distributed data acquisition system for implementing output generation logic in accordance with embodiments of the disclosure.

FIG. 7 shows a flow diagram 700 that describes the process within operation 610 of FIG. 6. The flow diagram illustrates an example method for selecting what output packet to generate and for control of a bus by a master node of an acquisition system, such as bus 106 and master node 102 of acquisition system 100 shown in FIG. 1. At operation 702 the master node determines whether the MISO channel (read transaction) with any of the slaves is active. If the determination at operation 702 is that the MISO channel is active then the method continues at operation 704 in which the master node generates a pull output control packet. This packet requests to start or resume the read transaction data transfer from a specific slave node. At operation 706, based on the pull output, the master node transfers control of the bus to the slave node associated with the active MISO channel for a maximum number of packet intervals during which time the slave node is expected to generate output to transfer data to the master node.

If it was determined at operation 702 that a MISO channel was not active, then at operation 708 a determination is made whether the MOSI channel (write transaction) is active or pending. If not, although not shown in FIG. 7, a control packet output for the purpose of updating sync time (t_s) can be transmitted to the bus. If it is determined at operation 708 that the MOSI channel is active or pending, then at operation 710, the master node pushes data to one or more slave nodes. The output packet serves to start, resume, and/or request status for the write transaction. At operation 712, a determination is made whether an acknowledgment is expected. If the determination at operation 712 is YES, that an acknowledgement is expected, then the method continues at operation 706. At operation 706, based on the request status output, the master node transfers control of the bus to the slave node associated with the active MOSI channel for one packet interval during which time the slave node is expected to generate output to indicate the status of its received input from the master node. If the determination at operation 712 is NO, that an acknowledgement is not expected, then the method continues at operation 714. At operation 714, a determination is made whether a last packet has been output. If the determination at operation 714 is NO, that the last packet was not output, the method ends, after which the method restarts at operation 702 at the next packet interval. Otherwise, if it was determined at operation 714 that YES, the last packet was output, then at operation 716 a determination is made whether the output is for a read transaction or a write transaction. If it is determined at operation 716 that NO, the output is not for a read operation but for a write operation, then the method continues at operation 718 in which the current transaction is completed, after which the method ends and restarts at operation 702 at the next packet interval. If it is determined at operation 716 that YES, the output is for a read operation, then the method continues at operation 720 in which a MISO channel for the slave device that is performing the read transaction is activated, after which the method ends and restarts at operation 702 at the next packet interval. Effectively, the master node writes data using the MOSI channel to trigger the slave node to buffer output which can then be pulled using the associated MISO channel.

Figure 8:
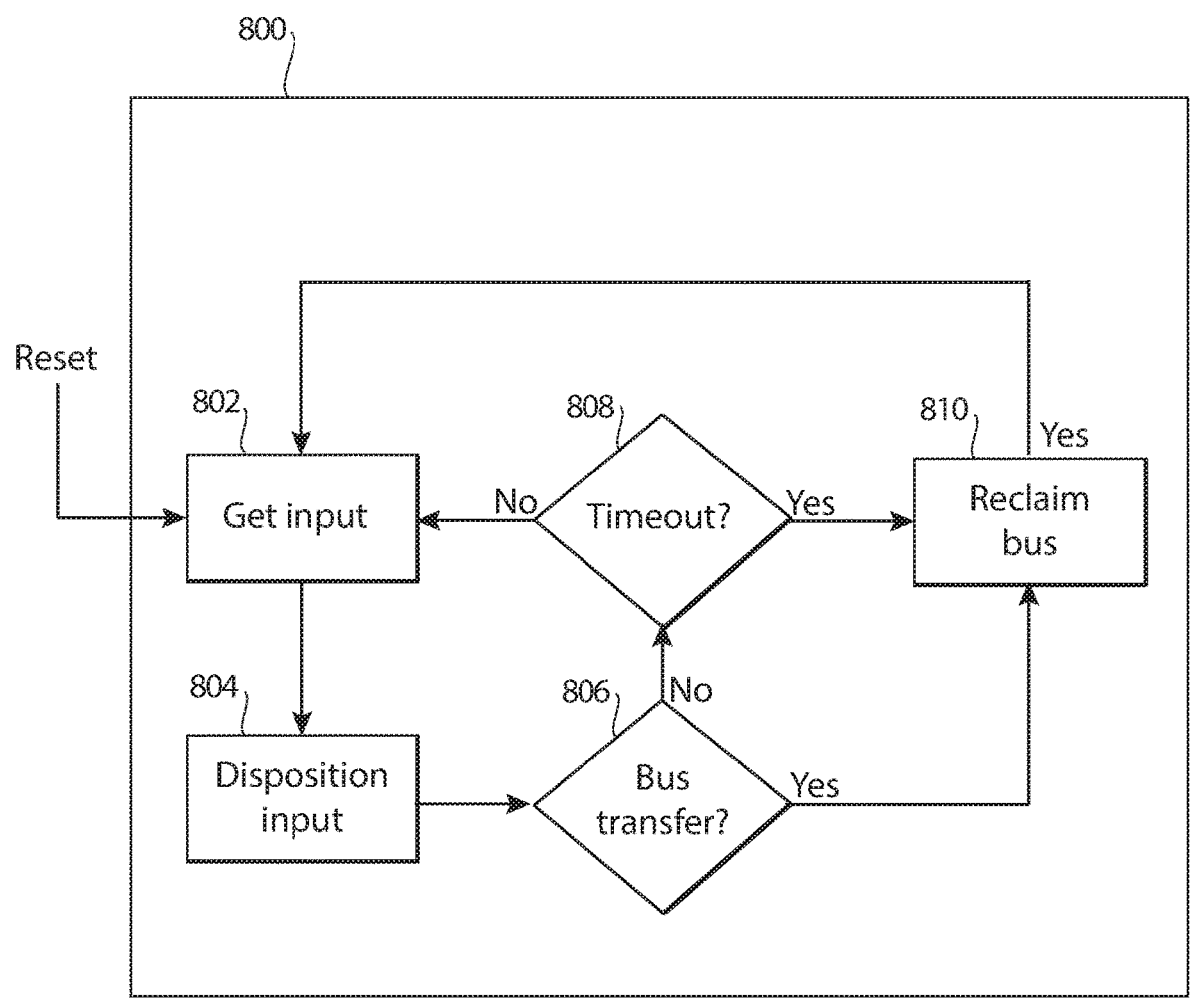
FIG. 8 is a flow diagram showing an example method performed by a master node of a distributed data acquisition system for implementing bus control logic in accordance with embodiments of the disclosure.

FIG. 8 shows a flow diagram 800 that illustrates an example method performed by the master node which provides for retaking of the bus by the master node based on slave node input or a timeout condition. At operation 802, while a slave node has control of the bus, the master node gets input data from the bus. At operation 804, the master node dispositions the input based on predetermined criteria. At operation 806, a determination is made whether the slave node has transferred bus ownership back to the master node. The slave node uses a bus control value of 1 to relinquish bus ownership if the last packet for the data transfer is reached or the number of allowed packets is reached. If the determination at operation 806 is that YES, conditions have been to reclaim the bus, then at operation 810 the master node reclaims the bus, after which the method continues at operation 802. If the determination at operation 806 is that NO, the slave node has not explicitly relinquished bus ownership, then at operation 808 a determination is made whether a timeout condition has been met. Effectively, the master node evaluates whether enough time has elapsed that it will retake bus ownership autonomously. The configurable timeout is selected to exceed the time corresponding to the number of packet intervals that the master node granted to the slave node during the last master node output packet. If the determination at operation 808 is that YES, that a timeout condition has been met, then at operation 810 the master node reclaims the bus, and the method continues at operation 802. If the determination at operation 808 is that NO, a timeout condition has not been met, then the method continues at operation 802.

Figure 9:
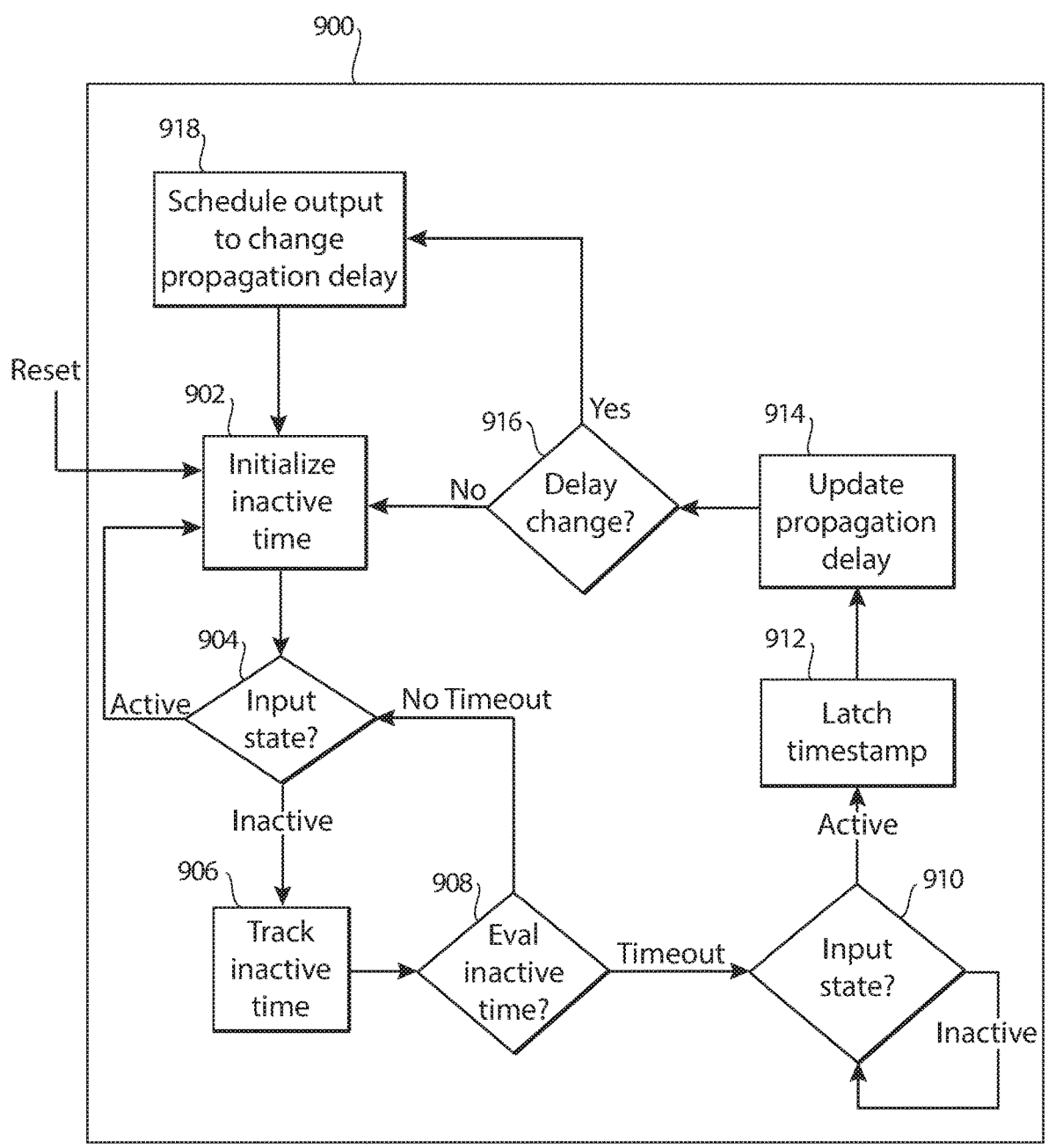
FIG. 9 shows a flowchart 900 that illustrates an example method performed by the master node for implementing propagation delay correction logic in accordance with embodiments of the disclosure.

FIG. 9 shows a flow diagram 900 that illustrates an example method performed by the master node for determining propagation delay correction. Transmissions on bus 106 from a slave node 104 that is received by the master node 102 can be routed for decoding, such as to an input of the UART, and can be further routed for capture, e.g., at a capture port, to evaluate signal transitions in order to timestamp the start of a new packet being received. The method can be performed by master node firmware. For example, by taking advantage of an expected inter-character gap time of 0 and a minimum inter-packet time of 10 μs, the master firmware can wait for a bus inactive condition followed by and active transition. For example, in an embodiment that uses a UART, a non-return to zero (NRZ) encoding scheme is used and an inactive condition is defined as logic level high, wherein an the active transition can be detected as a transition from logic level high to logic level low.

At operation 902, an inactive time counter is initialized in response to either a reset signal or an ACTIVE input from operation 904. At operation 904, a determination is made whether the master node input state is active or inactive, based on whether a new packet has been captured. If the input state is active, meaning a packet has been captured, control returns to operation 902 and the inactive time counter is reset to zero. If the input state is inactive, meaning a packet has not been captured, the method continues at operation 906. At operation 906, the inactive timer is incremented. At operation 908, the inactive time count value is evaluated to determine whether it has exceeded a threshold value. When the threshold value has been exceeded, a timeout condition is determined to have occurred. If the timeout condition has not occurred, meaning the inactive time counter did not exceed the threshold value, then control is returned to operation 904. If the timeout condition has occurred, the method continues at operation 910.

At operation 910 a determination is made again whether the slave node input state is active or inactive. Operation 910 is performed while the inactive timer continues to be incremented. If the determination is that the input state is inactive, operation 910 is repeated while the inactive time counter continues to be incremented.

If the input state is determined to be active, the method continues at operation 912 in which a timestamp of the current time e.g., captured from the free-running timer, is latched. The free-running timer's count value represents the current time $t\_c$. At operation 914, in addition to evaluating validity of the expected packet, the master node updates the propagation delay for the particular slave node that transmitted the detected transmission by determining the timing error ($t\_e$) relative to the master sync time ($t\_s$) using the calculation $t\_e = t\_k - t\_s - t\_prop$ where ($t\_prop$) is the current slave specific propagation delay. At operation 918, a determination is made whether the error is significant, e.g., exceeds a predetermined threshold, possibly after filtering. At operation 918, the master node schedules an output to the particular slave node to update the slave node's specific propagation delay. The propagation delay is updated by accumulating half the error to accommodate the delay in both directions.

A potential advantage of the various embodiments of the acquisition system disclosed is the ability to apply protocol logic to use of a communication link to accommodate data transfer between a master node and distributed slave nodes, correct for timing errors, and provide synchronization of distributed slave nodes. A separate synchronization link is not needed.

While shown and described in the exemplary context of health monitoring of aircraft engine related applications, those skilled in the art will readily appreciate that the acquisition system in accordance with this disclosure can be used in any other suitable application, including civil and military applications, that use highly correlated sensing data acquired by distributed slave nodes. Since correction of synchronization time for resynchronizing communication between the master node and the slave nodes can be a continual process, the acquisition system can be resynchronized even when propagation delays are changed based on installation and cabling modifications of the acquisition system. Thus, the acquisition system can be used for monitoring a stationary or mobile system, such as land, sea, space, or air-borne vehicle.

While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A slave node of a plurality of slave nodes of a distributed acquisition system, the slave node comprising:
a communication interface for interfacing between a control component and a bus, the bus being a communication bus coupled to a master node of the acquisition system and the other slave nodes of the plurality of nodes; and
the control component configured to:
acquire a configuration that provides a definition for a packet interval, wherein the packet interval definition provides an adequate timing margin to ensure that communication packets transmitted by the master node and the one or more slave nodes occur only at harmonics of the packet interval definition;
receive master communication packets from the master node via the bus;
determine a start time of at least one most recent master communication packet of the master communication packets received from the master node;
calculate a synchronization time based on the start time; and
start transmission of slave communication packets to the master node based on the synchronization time,
wherein the control component is further configured to determine whether the slave node has been granted ownership of the bus, wherein transmission of the slave communication packets is started only when the slave node is granted ownership,
wherein determining whether ownership of the bus has been granted to the slave node includes determining a limitation of access to the bus associated with the grant of ownership, and
wherein the control component is further configured to refrain from starting transmission of the slave communication packets when ownership of the bus is no longer granted due to the limitation of access.

2. The slave node of claim 1, wherein the grant of ownership to the slave node is exclusive to the slave node.

3. The slave node of claim 1, wherein the limitation of access specifies a maximum number of slave communication packets that are allowed to be transmitted by the slave node while the slave node is granted ownership of the bus, a time interval after which the grant of ownership of the bus by the slave expires, or a number of packet interval definitions available to be used on the bus by the slave while granted ownership of the bus.

4. The slave node of claim 1, wherein the packet interval definition is a maximum expected time between successive transmission start times of master communication packets transmitted by the master node, and the slave communication packets transmitted by the slave node are synchronized based on the packet interval definition.

5. The slave node of claim 4, wherein the packet interval definition accommodates a maximum expected transmission time for transmitting the master communication packets transmitted by the master node or the slave communication packets transmitted by any of the plurality of slave nodes based on maximum packet payload size and communication baud rate definitions of the acquired configuration.

6. A slave node of a plurality of slave nodes of a distributed acquisition system, the slave node comprising:
a communication interface for interfacing between a control component and a bus, the bus being a communication bus coupled to a master node of the acquisition system and the other slave nodes of the plurality of nodes; and
the control component configured to:
acquire a configuration that provides a definition for a packet interval, wherein the packet interval definition provides an adequate timing margin to ensure that communication packets transmitted by the master node and the one or more slave nodes occur only at harmonics of the packet interval definition;
receive master communication packets from the master node via the bus;
determine a start time of at least one most recent master communication packet of the master communication packets received from the master node;
calculate a synchronization time based on the start time; and
start transmission of slave communication packets to the master node based on the synchronization time,
wherein the control component is further configured to determine whether the slave node has been granted ownership of the bus, wherein transmission of the slave communication packets is started only when the slave node is granted ownership,
wherein a second master communication packet of the master communication packets received from the master node includes a request for acknowledgment that is received substantially together with a grant to ownership of the bus to the slave node,
wherein the synchronization time is updated based on the time of receipt of the second master communication packet, and
wherein a slave communication packet of the slave communication packets transmitted to the master node is started in response to the request for acknowledgment further based on the packet interval definition.

7. A slave node of a plurality of slave nodes of a distributed acquisition system, the slave node comprising:
a communication interface for interfacing between a control component and a bus, the bus being a communication bus coupled to a master node of the acquisition system and the other slave nodes of the plurality of nodes; and
the control component configured to:
acquire a configuration that provides a definition for a packet interval, wherein the packet interval definition provides an adequate timing margin to ensure that communication packets transmitted by the master node and the one or more slave nodes occur only at harmonics of the packet interval definition;
receive master communication packets from the master node via the bus;
determine a start time of at least one most recent master communication packet of the master communication packets received from the master node;
calculate a synchronization time based on the start time; and
start transmission of slave communication packets to the master node based on the synchronization time,
wherein a second master communication packet of the master communication packets received from the master node includes a propagation delay measured by the master node based on an amount of time between start of transmission of the second master communication packet until time of receipt of the second master communication packet by the slave node and/or an amount of time between start of transmission of the communication packet transmitted by the slave node until receipt of the slave communication packet by the master node, and wherein the control component is further configured to adjust a time for starting transmission of subsequent slave communication packets based on the propagation delay.

8. The slave node of claim 1, wherein the packet interval definition is based on delays caused by at least one of baud rate error due to clock differences between the master node and the slave node, processing when transitioning between control of the bus by the master node or the slave node to the other of the master node and the slave node, and sum of intercharacter timing gaps.

9. The slave node of claim 1, further comprising:
a sensing element configured to sense a physical property and outputs sensing data based on the sensing; and
a buffer configured to buffer the sensing data, wherein,
a second master communication packet of the master communication packets received from the master node includes a request for sensed data, and
the control component is further configured to include sensing data buffered by the buffer in one or more of the slave communication packets transmitted to the master node in response to receiving the second master communication packet.

10. A method of synchronizing communication between a slave node of one or more slave nodes and a master node of a distributed acquisition system, the method comprising:
acquiring a configuration that provides a definition for a packet interval, wherein the packet interval definition provides an adequate timing margin to ensure that communication packets transmitted by the master node and the one or more slave nodes occur only at harmonics of the packet interval definition;
receiving master communication packets from the master node via the bus;
determining a start time of at least one most recent master communication packet of the master communication packets received from the master node;
calculating a synchronization time based on the start time;
starting transmission of slave communication packets to the master node based on the synchronization time; and
determining whether the slave node has been granted ownership of the bus,
wherein transmission of the slave communication packets is started only when the slave node is granted ownership,
wherein determining whether ownership of the bus has been granted to the slave node includes determining a limitation of access to the bus associated with the grant of ownership, and
wherein the control component is further configured to refrain from starting transmission of the slave communication packets when ownership of the bus is no longer granted due to the limitation of access.

11. The method of claim 10, wherein the grant of ownership to the slave node is exclusive to the slave node.

12. A method of synchronizing communication between a slave node of one or more slave nodes and a master node of a distributed acquisition system, the method comprising:
acquiring a configuration that provides a definition for a packet interval, wherein the packet interval definition provides an adequate timing margin to ensure that communication packets transmitted by the master node and the one or more slave nodes occur only at harmonics of the packet interval definition;
receiving master communication packets from the master node via the bus;
determining a start time of at least one most recent master communication packet of the master communication packets received from the master node;
calculating a synchronization time based on the start time; and
starting transmission of slave communication packets to the master node based on the synchronization time,
wherein a second master communication packet of the master communication packets received from the master node control component includes a request for acknowledgment that is received substantially together with a grant to ownership of the bus to the slave node,
wherein the synchronization time is updated based on the time of receipt of the second master communication packet, and
wherein the method includes starting a slave communication packet of the slave communication packets in response to the request for acknowledgment further based on the synchronization time and the packet interval definition.

13. A method of synchronizing communication between a slave node of one or more slave nodes and a master node of a distributed acquisition system, the method comprising:
acquiring a configuration that provides a definition for a packet interval, wherein the packet interval definition provides an adequate timing margin to ensure that communication packets transmitted by the master node and the one or more slave nodes occur only at harmonics of the packet interval definition;
receiving master communication packets from the master node via the bus;
determining a start time of at least one most recent master communication packet of the master communication packets received from the master node;
calculating a synchronization time based on the start time; and
starting transmission of slave communication packets to the master node based on the synchronization time,
wherein a second master communication packet of the master communication packets received from the master node includes a propagation delay measured by the master node based on an amount of time between start of transmission of the second master communication packet until time of receipt of the second master communication packet by the slave node and/or an amount of time between start of transmission of the communication packet transmitted by the slave node until receipt of the slave communication packet by the master node, and
the method further includes adjusting a time for starting transmission of subsequent slave communication packets based on the propagation delay.

14. The method of claim 10, further comprising:
sensing a physical property;
outputting sensing data based on the sensing; and
buffering the sensed data,
wherein, a master communication packet of the master communication packets received from the master node control component includes a request for sensed data, and
the method further comprises including sensed data buffered by the buffer in one or more of the slave communication packets transmitted to the master node in response to receiving the master communication packet.

15. A control component of a slave node of a plurality of distributed slave nodes of an acquisition system that communicate with a master node via a bus, the control component configured to:
- acquire a configuration that provides a definition for a packet interval, wherein the packet interval definition provides an adequate timing margin to ensure that communication packets transmitted by the master node and the one or more slave nodes occur only at harmonics of the packet interval definition;
- receive master communication packets from the master node via the bus;
- determine a start time of at least one most recent master communication packet of the master communication packets received from the master node;
- calculate a synchronization time based on the start time; and
- start transmission of slave communication packets to the master node based on the synchronization time,
- wherein a second master communication packet of the master communication packets received from the master node includes a propagation delay measured by the master node based on an amount of time between start of transmission of the second master communication packet until time of receipt of the second master communication packet by the slave node and/or an amount of time between start of transmission of the communication packet transmitted by the slave node until receipt of the slave communication packet by the master node, and
- the method further includes adjusting a time for starting transmission of subsequent slave communication packets based on the propagation delay.

16. The control component of claim 15, wherein,
- a third master communication packet of the master communication packets received from the master node control component includes a request for sensed data, and
- the control component is further configured to include buffered sensing data sensed and buffered by the sensing node in one or more of the communication packets transmitted to the master node in response to receiving the third master communication packet.

* * * * *